UNITED STATES PATENT OFFICE.

ALEXANDER HAMBURGER, OF ELBERFELD, GERMANY, ASSIGNOR TO FARBEN-FABRIKEN VORM. FRIEDR. BAYER & CO., OF ELBERFELD, GERMANY, A CORPORATION OF GERMANY.

VAT DYE.

1,115,189.      Specification of Letters Patent.      Patented Oct. 27, 1914.

No Drawing.      Application filed July 25, 1912. Serial No. 711,562.

*To all whom it may concern:*

Be it known that I, ALEXANDER HAMBURGER, doctor of philosophy, chemist, citizen of the German Empire, residing at Elberfeld, Germany, have invented new and useful Improvements in New Vat Dye, of which the following is a specification.

The present invention is a continuational application of my application Serial No. 667630 filed December 26, 1911 and concerns the production of a new and valuable coloring matter dyeing cotton from the alkaline hydrosulfite vat in yellow shades which can be obtained by treating 2-chloroanthraquinone with an alkaline or alkali metal sulfid.

In order to illustrate my invention, I give the following example, the parts being by weight:—40 parts of finely powdered sodium sulfid are added to a solution of 40 parts of 2-chloroanthraquinone in 100 parts of naphthalene, which solution is heated to 200–220° C. The melt which has to be stirred is kept at this temperature during about 3 hours until a test portion is soluble in concentrated sulfuric acid with a violet coloration. Subsequently the cooled melt is diluted with toluene and the precipitate is filtered off and then washed with hot water and dried. The new product crystallizes from nitrobenzene in the shape of yellow needles which are soluble in concentrated sulfuric acid with a violet coloration. It dyes cotton from an alkaline hydrosulfite vat in fast yellow shades. The new body has most probably the formula:

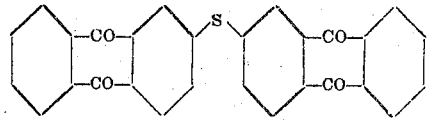

The same dyestuff can be produced from 2-chloroanthraquinone and the potassium salt of xanthic acid.

I claim:—

1. As a new process, the manufacture of beta-beta-dianthraquinonyl sulfid by treating about two molecules of beta-halogen-anthraquinone with about one molecule of alkali metal sulfid.

2. As a new product, beta-beta-dianthraquinonyl sulfid, being a yellow powder, insoluble in dilute alkalis and dilute acids, difficultly soluble in organic solvents, soluble with a voilet-red color in concentrated sulfuric acid, and yielding, when treated with alkaline reducing agents, an orange-red vat which dyes, particularly wool, intense yellow tints of great fastness.

In testimony whereof I have hereunto set my hand in the presence of two subscribing witnesses.

ALEXANDER HAMBURGER.

Witnesses:
 HELEN NUFER,
 ALBERT NUFER.